(12) United States Patent
Fedor (10) Patent No.: US 8,747,932 B2
(45) Date of Patent: Jun. 10, 2014

(54) METHOD OF BREWING A BEVERAGE WITH AN ELONGATE MEMBER

(71) Applicant: John A. Fedor, Edison, NJ (US)

(72) Inventor: John A. Fedor, Edison, NJ (US)

( * ) Notice: Subject to any disclaimer, the term of this patent is extended or adjusted under 35 U.S.C. 154(b) by 0 days.

(21) Appl. No.: 13/910,660

(22) Filed: Jun. 5, 2013

(65) Prior Publication Data

US 2013/0259993 A1    Oct. 3, 2013

Related U.S. Application Data

(63) Continuation of application No. 13/299,509, filed on Nov. 18, 2011, now Pat. No. 8,479,637.

(51) Int. Cl.
*A47J 31/44* (2006.01)

(52) U.S. Cl.
USPC ............. 426/431; 426/433; 426/435; 426/77; 426/78; 426/79; 426/82; 426/112

(58) Field of Classification Search
USPC .......... 426/431, 433, 435, 77, 78, 79, 82, 112
See application file for complete search history.

(56) References Cited

U.S. PATENT DOCUMENTS

| 3,345,935 | A | * | 10/1967 | Waline | 99/295 |
| 3,561,602 | A | * | 2/1971 | Molitor | 210/266 |
| 4,119,019 | A | * | 10/1978 | Reid | 99/306 |
| 4,446,158 | A | * | 5/1984 | English et al. | 426/79 |
| 7,294,266 | B2 | * | 11/2007 | Vetterli | 210/282 |
| 7,363,852 | B2 | * | 4/2008 | Mangiapane | 99/291 |
| 8,147,886 | B2 | * | 4/2012 | Steenhof et al. | 426/77 |

FOREIGN PATENT DOCUMENTS

JP            403004817      *  1/1991

* cited by examiner

*Primary Examiner* — Anthony Weier
(74) *Attorney, Agent, or Firm* — Ward & Zinna, LLC (57) ABSTRACT

An apparatus for brewing a beverage, which includes an elongated member having a plurality of disks stacked along an axis of the elongated member; a filter having at least one slot and adapted to fit over the plurality of disks; and an elongated housing member having first and second slots on opposite sides of the elongated housing member, wherein the elongated housing member is adapted to fit over the filter.

20 Claims, 9 Drawing Sheets

METHOD OF BREWING A BEVERAGE WITH AN ELONGATE MEMBER

CROSS-REFERENCE TO RELATED APPLICATION

This is a continuation of U.S. application Ser. No. 13/299,509, filed Nov. 18, 2011, the entire contents of which are hereby incorporated by reference.

FIELD OF THE INVENTION

This invention relates generally to the field of brewed beverages, and, more particularly, to a novel and improved beverage brewing system and method of use.

BACKGROUND OF THE INVENTION

For years, drip-type electric brewing machines have been used as an efficient means for making coffee. In general, these electric coffee brewing machines include a cold water reservoir, an electric resistance heating element for heating the water, and a reusable plastic brew basket for holding ground coffee or coffee granules in a paper coffee filter. To make coffee, cold water is poured into the water reservoir and ground coffee is placed in a coffee filter, which is in turn placed in the brew basket. The cold water is heated by the electric heating element, and the heated water then saturates the ground coffee. The brewed coffee then drips out into a receiving vessel, e.g., a coffee pot, a coffee cup, and the like, which is positioned below the brew basket. After brewing is complete, the paper filter and used coffee grounds are usually taken out of the plastic brew basket and discarded. Then, the brew basket and coffee pot are cleaned for re-use.

While such drip coffee makers are relatively fast and efficient, the process of cleaning the plastic brew basket and coffee pot after each use is time consuming. Moreover, if the brew basket and coffee pot are not cleaned regularly, the quality and taste of the brewed coffee is compromised. A related problem occurs when such drip coffee makers are used to brew flavored coffee. Unless the brew basket and coffee pot are cleaned thoroughly, the taste and strong scent of flavored coffee tends to linger in the brew basket and coffee pot and can be detected when these components are reused to brew coffee of a different flavor.

While these types of coffee makers and hot beverage makers have existed for quite some time, a relatively new market development has been created for single serve beverage appliances. Such machines are all designed to quickly brew a single cup of coffee or tea at a time. In the United States, the most widely available of these is made by Keurig Company, in which coffee grounds are filled into single-serving pods called K-Cups®. The user inserts a K-Cup® into the machine, places a coffee cup or mug under the spout, and presses an actuation button to allow hot water to be dispensed through the K-Cup®. The K-Cup® forms an internal brewing volume, and allows for sufficient mixing and steeping time to form a brewed beverage before being filtered and dispensed into the mug. In this manner, a cup of coffee, tea or hot chocolate is prepared. By omitting the K-cup®, users can also prepare a mug of hot water, which can then be dispensed for use in making hot cocoa, tea, instant soup, or other hot drinks directly within the mug.

Similar single serve beverage devices are provided by Flavia® Beverage Systems (a division of Mars, Incorporated), Nespresso™ (of Nestle Nespresso S.A., an operating unit of the Nestle Group), Senseo® coffee brewing system from Dutch companies Philips and Douwe Egberts, a subsidiary of Sara Lee Corporation), and the Tassimo® Hot Beverage System (developed by Kraft Foods, Inc.), just to name a few.

These single server beverage machines alleviate some of the problems indicated above with respect to the time consuming process of cleaning the plastic brew basket and coffee pot after each use of the more traditional electric brewing machines. However, these single serve beverage machines lack the ability to brew coffee specific to the user's taste at a temperature desired by the user. Moreover, the design of these single serve beverage machines cause the coffee granules to immediately float to the top of the water before clotting, which results in the coffee granules clumping at the surface and a dramatic loss of flavor during the brewing process.

There is therefore a need for a beverage brewing system and method of use that overcomes some or all of the previously delineated drawbacks of prior beverage brewing systems.

SUMMARY OF THE INVENTION

The present invention is a beverage brewing system and method of use. The beverage brewing system is preferably used to brew or prepare beverages such as, but not limited to coffee, tea, hot chocolate, and the like. The terms "brew" and "brewing" are used throughout this specification in connection with preparing beverages such as coffee, tea, and hot chocolate. As such, the terms "brew" and "brewing" shall refer to any commonly known method or process for creating and/or preparing a beverage using a liquid. For example, hot chocolate is generally dissolved in hot water; however, for the purposes of this disclosure, the process of dissolving hot chocolate granules shall be considered "brewing" hot chocolate, without limiting the scope of the invention.

The beverage brewing system preferably comprises three elements: (i) an elongated member having disks stacked along the vertical axis of the elongated member; (ii) a porous member or filter; and (iii) a tubular or an elongated housing member. The beverage brewing system of the present invention and its method of use may be utilized to quickly and efficiently brew a more flavorful beverage at a desired temperature. This is done by preventing the granules used to brew the beverage from floating to the surface of the water, clumping together, and clotting at the surface of the water. Instead, the beverage brewing system of the present invention causes the granules to remain entirely immersed within the water through the entire brewing process. For example, the granules remain entirely submerged within the water during the floating stage, the brewing stage, and finally the clotting stage.

Moreover, the beverage brewing system of the present invention may be used to brew a beverage at a desired strength by providing a system that allows a user to measure the amount of granules to add to the beverage brewing system. For example, it is contemplated that a guide or scale may be provided on the exterior surface of the tubular member to assist the user in determining a particular number of disks to fill with granules of the beverage to be brewed in order to brew a beverage at a desired strength.

Once the disks of the beverage brewing system of the present invention are filled with granules and the beverage brewing system is submerged into a container of water, the water circulates through the beverage brewing system thereby distributing the flavor of the granules into the water. Once a beverage has been brewed using the beverage brewing system of the present invention, the system may then be cleaned, stored, and subsequently reused at a later time.

Moreover, the beverage brewing system of the present invention may be used as a scoop to fill the disks. For example, the beverage brewing system of the present invention may be dipped into a container of granules, whereby the granules are subsequently scooped onto the surface of the disks. The beverage brewing system of the present invention may also be used as a stirrer in order to facilitate the brewing process. It should be understood that the beverage brewing system of the present invention may be implemented with any container adapted to hold a liquid. It should also be understood that any type of heat source may be used to heat the liquid.

In a first non-limiting aspect of the invention, an apparatus for brewing a beverage is provided. The apparatus comprises an elongated member having a plurality of disks stacked along an axis of the elongated member; a filter having at least one slot and adapted to fit over the plurality of disks; and a tubular housing member having first and second slots on opposite sides of the tubular housing member, wherein the tubular housing member is adapted to fit over the filter.

In a second non-limiting aspect of the invention, an apparatus for brewing a beverage is provided. The apparatus comprises a plurality of disks spaced apart along an elongated member; a filter having at least one slot, wherein the filter fits over the plurality of disks; and an elongated housing member having at least one first slot and at least one second slot, wherein the elongated housing member fits over the filter.

In a third non-limiting aspect of the invention, a method for brewing a beverage using an apparatus comprising an elongated member, a plurality of disks, a filter, and an elongated housing member is provided. The method preferably comprises the steps of separating the tubular housing member from a base of the apparatus to reveal at least one of the plurality of disks; filling at least one of the disks of the plurality of disks with granules; coupling the elongated housing member to the base of the apparatus; applying heat to a liquid; and submerging at least a portion of the apparatus into the liquid.

In a fourth non-limiting aspect of the invention, a filter assembly is provided. The filter assembly comprises an elongated member, wherein the elongated member is constructed from a water permeable material; and a slot is provided along a portion of a length of the elongated member.

BRIEF DESCRIPTION OF THE DRAWINGS

A further understanding of the invention can be obtained by reference to a preferred embodiment set forth in the illustrations of the accompanying drawings. Although the illustrated embodiment is merely exemplary of systems and methods for carrying out the invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the invention, reference is now made to the following drawings in which.

DETAILED DESCRIPTION OF THE INVENTION

The invention may be understood more readily by reference to the following detailed description of preferred embodiment of the invention. However, techniques, systems and operating structures in accordance with the invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the invention. It must be noted that, as used in the specification and the appended claims, the singular forms "a", "an", and "the" include plural referents unless the context clearly indicates otherwise.

Figure 1:
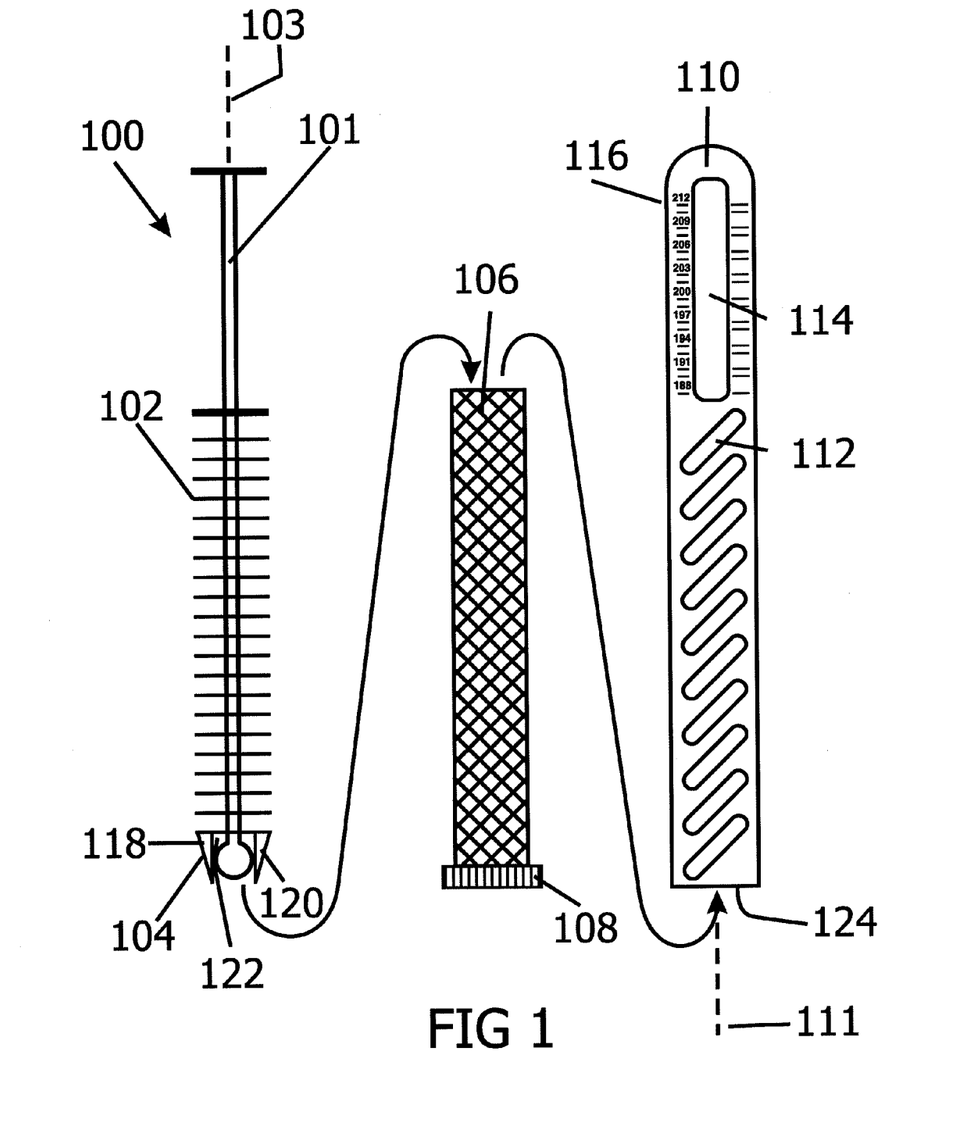
FIG. 1 is a front view of the components of a beverage brewing system according to an embodiment of the invention.
Figure 2:
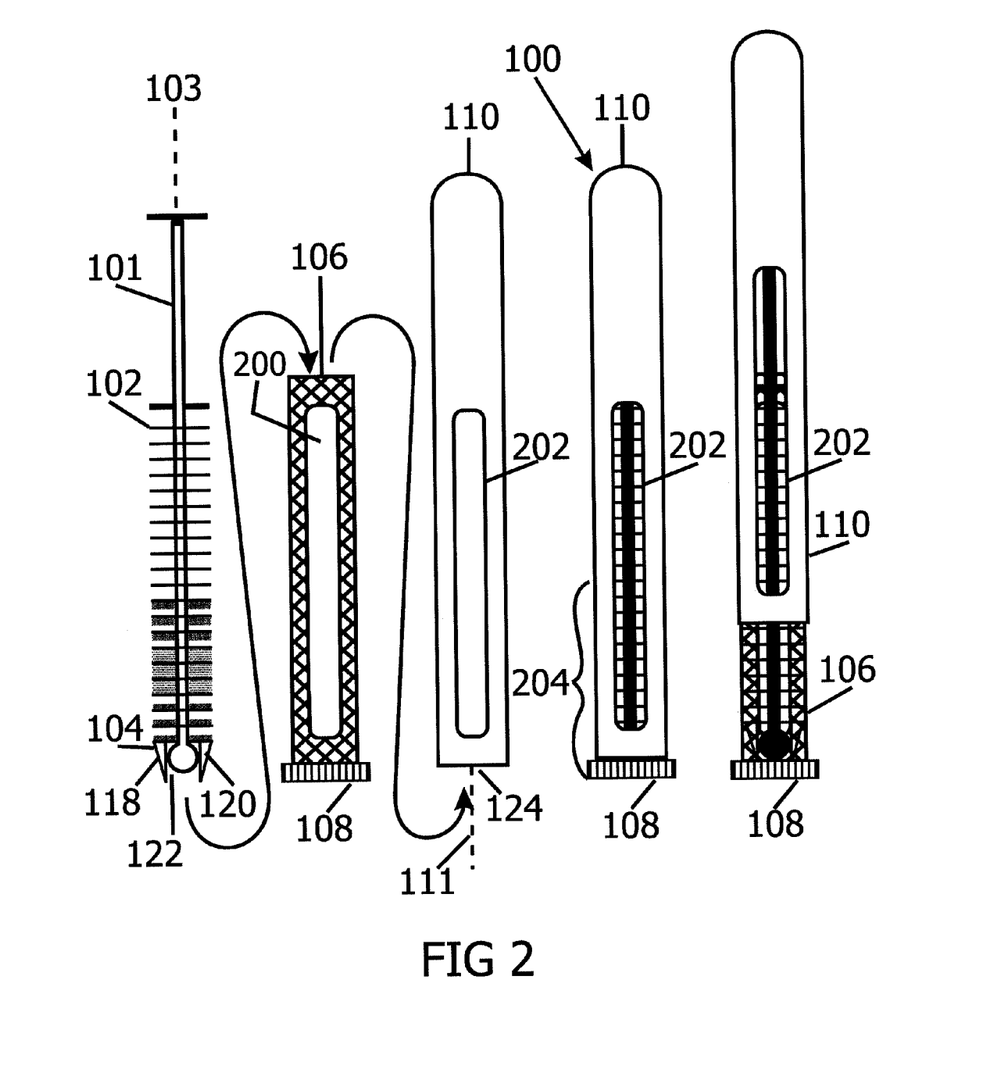
FIG. 2 is a back view of the components of a beverage brewing system according to an embodiment of the invention.

Referring now to the figures, wherein like numerals indicate like elements throughout, FIGS. 1 and 2 illustrate an embodiment of beverage brewing system 100 comprising three components. Specifically, beverage brewing system 100 preferably comprises an elongated member 101, a porous member or filter 106, and a tubular or an elongated housing member 110.

Elongated member 101 comprises a plurality of disks 102 stacked along a vertical axis 103 of elongated member 101. As shown in FIGS. 1 and 2, approximately twenty disks 102 are provided along the vertical axis 103 of elongated member 101. However, it should be appreciated that any number of disks 102 may be implemented without limiting the scope of the invention. Each disk 102 preferably comprises an aperture (not shown) centrally located and adapted to receive elongated member 101. The diameter of each aperture (not shown) of each disk 102 is adapted to be slightly larger than the diameter of elongated member 101 so that each disk 102 may be securely held in place. As shown in FIGS. 1 and 2, each disk 102 is preferably flat and extends circumferentially about the vertical axis 103 of elongated member 101. Moreover, elongated member 101 and disks 102 may be formed as one molded component, i.e., from molded glass, plastic, metal, any suitable synthetic material, and the like.

Elongated member 101 also comprises an attachment member 104. Attachment member 104 preferably extends from the bottom portion of elongated member 101 as one molded component. As shown in FIGS. 1 and 2, attachment member 104 comprises two prongs 118 and 120 and a cavity 122 disposed therebetween. As will be described below, prongs 118 and 120 are preferably used to snap fit into base 108 of porous member 106.

It should be appreciated that elongated member 101, disks 102, and attachment member 104 may all be molded together as one component, without limiting the scope of the invention. Moreover, elongated member 101, disks 102, and attachment member 104 may comprise any glass, plastic, metal, any synthetic material, and the like suitable for heating. Particularly, such material is suitable to withstand temperatures commonly reached during the brewing of coffee, tea, hot chocolate, and the like. Such suitable glass is Pyrex®, gorilla® glass, and the like.

Elongated member 101 may optionally be a thermometer. Moreover, it is contemplated that elongated member 101 may be a circular thermometer, whereby when it is submerged in a liquid the temperature of that liquid is indicated via a display. Circular thermometers are well known and therefore will not be discussed further. It is also contemplated that any type of thermometer may be used in conjunction with beverage brewing system 100 in order to determine the temperature of the liquid during the brewing process. Providing a means for determining the temperature of the liquid during the brewing process, allows a user to brew a beverage (i.e., coffee, tea, hot chocolate and the like) at a desired temperature.

As shown in FIGS. 1 and 2, elongated member 101 is preferably placed inside porous member or filter 106. Porous member 106 is preferably cylindrically shaped to fit over disks 102. Specifically, it is contemplated that porous member 106 be long enough to cover disks 102 when elongated member 101 is disposed within porous member 106. Porous member 106 preferably comprises a water permeable material, such as filter paper, so that during the brewing process, water may enter and exit porous member 106. Moreover, porous member 106 may comprise any material commonly used for brewing a beverage, such as coffee, tea, and the like. It is further contemplated that porous member 106 may comprise any plastic, metal, or synthetic material that may be designed to perform the function of a traditional beverage brewing filter. That is, porous member 106 preferably comprises a material that is suitable to allow water to pass through it while at the same time is capable of preventing coffee granules or tea granules from exiting. The diameter of porous member 106 is preferably slightly larger than the diameter of disks 102 so that porous member 106 forms a precise fit over disks 102 when elongated member 101 is placed inside porous member 106. It should also be appreciated that porous member 106 is capable of being both reusable and replaceable.

Extending from the bottom portion of porous member 106 is a base 108. Base 108 may be coupled to porous member 106 by any means, without limiting the scope of the invention. To couple elongated member 101 to porous member 106, elongated member is placed inside porous member 106 and slid down the length of porous member 106 until attachment member 104 is securely attached to base 108. More specifically, to couple attachment member 104 to base 108, prongs 118 and 120 of attachment member 104 preferably snap fit into grooves (not shown) disposed within base 108. However, it should be understood that any commonly known method for attaching elongated member 101 to porous member 106 may be implemented, without liming the invention.

While one method for coupling elongated member 101 and porous member 106 has been shown and described, it should be appreciated that there are several methods that may be implemented, without limiting the scope of the invention. For example, it is contemplated that base 108 may be provided at the bottom portion of elongated member 101, whereby porous member 106 is placed over the top portion of elongated member 101 and down over disks 102 until porous member 106 reaches base 108. By employing this method, porous member 106 is coupled to elongated member 101 via a precision or frictional fit over disks 102, whereby the tight fit between porous member 106 and disks 102 securely holds porous member 106 over disks 102.

Further, as shown in FIG. 2, an elongated slot 200 is preferably provided along a portion of the exterior surface of porous member 106. Elongated slot 200 is provided along a substantial portion of the length of porous member 106, e.g., more than half the length of porous member 106, and ranges from about 30 degrees to about 90 degrees wide. While a particular length and width of slot 200 has been disclosed, it should be appreciated that the length and width of slot 200 may vary outside of the given range, without limiting the scope of the invention. As will be explained in more detail below, elongated slot 200 provides access to disks 102 so that a user may easily fill the appropriate amount of disks 102 with coffee, tea, or chocolate granules.

Further as shown in FIGS. 1 and 2, once elongated member 101 has been coupled to porous member 106 or vice versa, the coupled components are placed through opening 124 and inside tubular housing member 110, whereby tubular housing member 110 is coupled to base 108. Any commonly used coupling means, including but not limited to a snap fit, a threaded fit, and the like, may be implemented to couple the bottom portion of tubular housing member 110 to base 108, without limiting the scope of the invention. The diameter of tubular housing member 110 is larger than the diameter of porous member 106 so that tubular housing member 110 may fit over porous member 106. Moreover, tubular housing member 110 may be constructed from the same or similar materials as elongated member 101 and disks 102, which is suitable for heating, i.e., glass (e.g., Pyrex®, gorilla®, etc.), plastic, metal, any suitable synthetic material, and the like.

Figure 5:
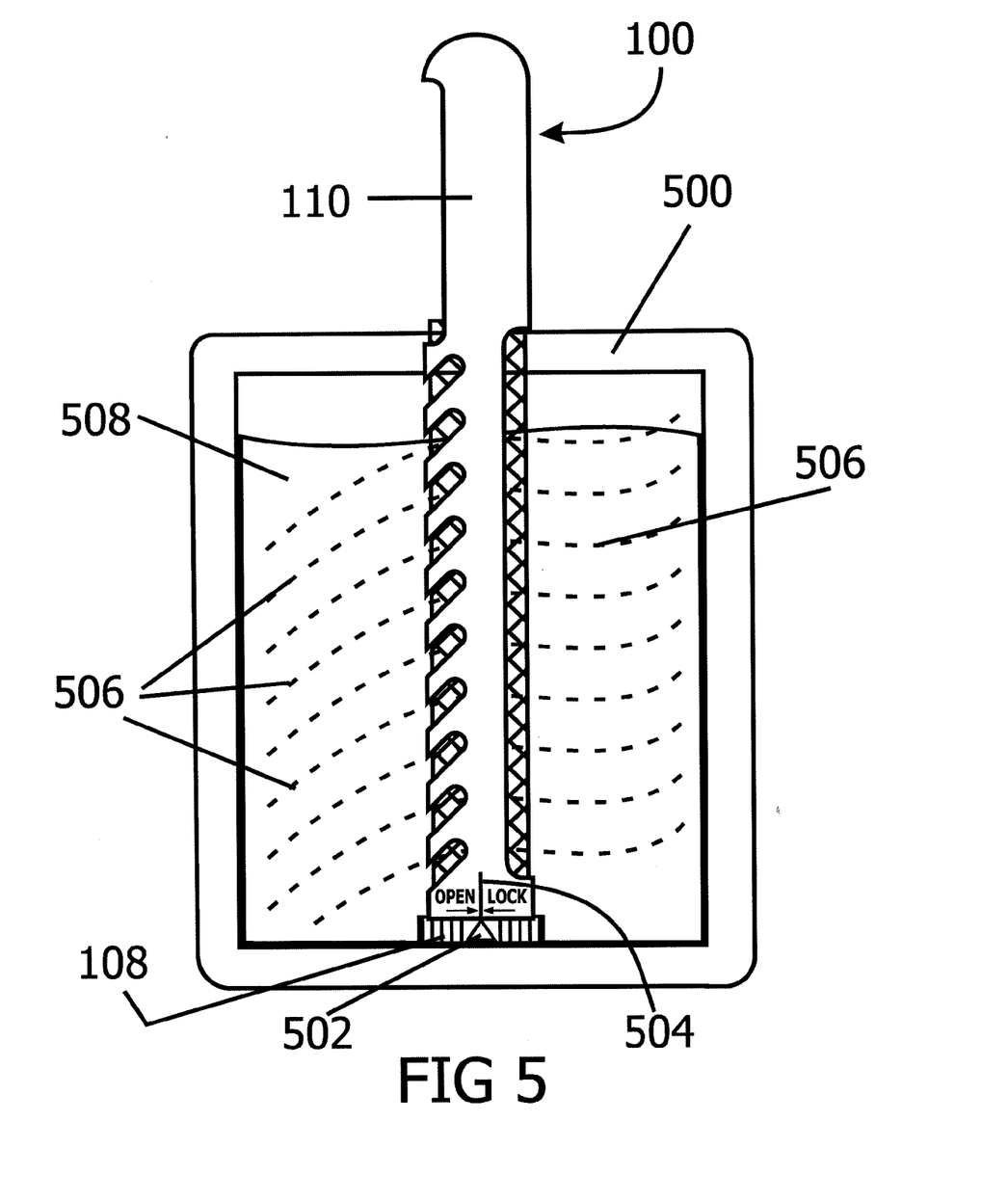
FIG. 5 is a side view of a beverage brewing system implemented with a cup according to an embodiment of the invention.

Tubular housing member 110 is preferably elongated along a vertical axis 111 and is cylindrical in shape. Tubular housing member 110 preferably comprises an opening 124 at one end, which is adapted to receive elongated member 101 and porous member 106. Moreover, tubular housing member 110 preferably comprises a plurality of slots 112 on one side, wherein slots 112 are provided along vertical axis 111. As shown in FIG. 1, slots 112 are preferably oriented diagonally across the exterior surface of tubular housing member 110. The diagonal orientation of slots 112 serves to facilitate the circulation of water through beverage brewing system 100. For example, heating water causes it to rise naturally towards the surface. As shown in FIG. 5, as the hot water rises, it naturally flows up through diagonal slots 112 and into beverage brewing system 100.

Tubular housing member 110 also preferably comprises an elongated slot or window 114 above slots 112, which may be used to view elongated member or thermometer 101. It is contemplated that a user may use the combination of elongated slot 114 and scale of temperatures 116 printed on the external surface of tubular housing member 110 to determine the temperature of a liquid being brewed by beverage brewing system 100. This feature allows a user to brew a beverage (i.e., coffee, tea, hot chocolate and the like) at a desired temperature.

Further, as shown in FIG. 2, an elongated slot 202 is provided along a portion of the exterior surface of tubular housing member 110. Elongated slot 202 is preferably provided on the side opposite, i.e., about 180 degrees, from slots 112 and elongated slot 114. Elongated slot 202 is also preferably provided along a substantial portion of the length of tubular housing member 110, e.g., more than half the length of tubular housing member 110, and ranges from about 30 degrees to about 90 degrees wide. While a particular length and width of slot 202 has been disclosed, it should be appreciated that the length and width of slot 202 may vary outside of the given range, without limiting the scope of the invention. As will be explained in more detail below, elongated slot 202 provides access to disks 102 so that a user may easily fill the appropriate amount of disks 102 with coffee tea, and/or chocolate granules. Slot 202 is also provided to facilitate the free flow of water through beverage brewing system 100. For example, it is contemplated that during the brewing process, water enters beverage brewing system 100 via slots 112, flows through one end of porous member 106, where it comes into contact with the granules, continues through the opposite end of porous member 106, and finally exits beverage brewing system 100 via slot 202.

As will be described below, beverage brewing system 100 allows a user to use disks 102 to measure the appropriate amount of coffee, tea, and/or chocolate granules required to brew coffee, tea, and/or hot chocolate at a desired strength and with a desired flavor. Furthermore, as will be explained below, it is believed that beverage brewing system 100, via the implementation of disks 102, maximizes the flavor of the beverage, e.g., coffee, tea, and/or hot chocolate, that is brewed. More specifically, it is believed that disks 102 prevent the granules from floating to the surface of the liquid so that all the granules are utilized during the brewing process.

The following describes the method of preparing beverage brewing system 100 for brewing a beverage. In the following example, the beverage being brewed is coffee; however, it should be appreciated that this invention can be used to brew any beverage that can be brewed using the same or similar process, without limiting the scope of the invention. Starting with beverage brewing system 100 in the closed position 204, a user first raises tubular housing member 110 from base 108 by either twisting tubular housing member 110 relative to base 108 or simply pulling the two members apart. Once uncoupled, the user may then raise tubular housing member 110 to reveal the appropriate amount of disks 102 necessary to achieve the user's desired strength of coffee brewed when those disks are filled with coffee granules. To assist the user in determining the amount of disks 102 to fill, it is contemplated that beverage brewing system 100 may comprise a guide (not shown) printed on the exterior surface of tubular housing member 110 to assist the user in determining the amount of disks 102 to fill with coffee granules based on the strength of coffee desired by the user.

Figure 3:
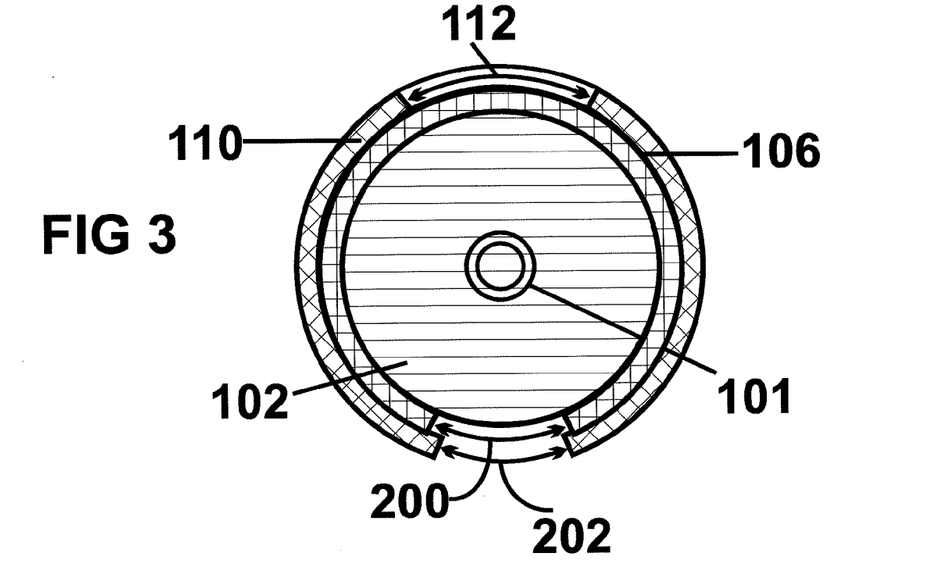
FIG. 3 is a cross-sectional view of a beverage brewing system in a first position according to an embodiment of the invention.

As an alternate method of preparing to fill beverage brewing system 100 with coffee granules, instead of raising tubular housing member 110 from base 108, the user may align elongated slot 200 of porous member 106 and elongated slot 202 of tubular housing member 110 to reveal a clear path to disks 102. The slots may be aligned by rotating base 108, which causes porous member 106 to rotate relative to tubular housing member 110. Moreover, it is contemplated that a marking (not shown) may be provided on base 108 and a marking (not shown) may be provided on tubular housing member 110, in order to assist the user in aligning elongated slot 200 with elongated slot 202, wherein vertically aligning the two markings indicates that elongated slots 200 and 202 are aligned. The proper alignment may be better understood upon reviewing FIG. 3, which illustrates a cross-sectional view of beverage brewing system 100.

After either the user has raised tubular housing member 110 to the desired height or aligned elongated slots 200 and 202 as just described, beverage brewing system 100 is prepared to receive coffee granules onto disks 102. One method for filling disks 102 is to use beverage brewing system 100 as a scoop, whereby the user may dip beverage brewing system 100 directly into coffee granules and scoop them onto exposed disks 102. Another method for filling disks 102 is to scoop the coffee granules onto disks 102 using any appropriate utensil, e.g., a spoon.

Figure 4:
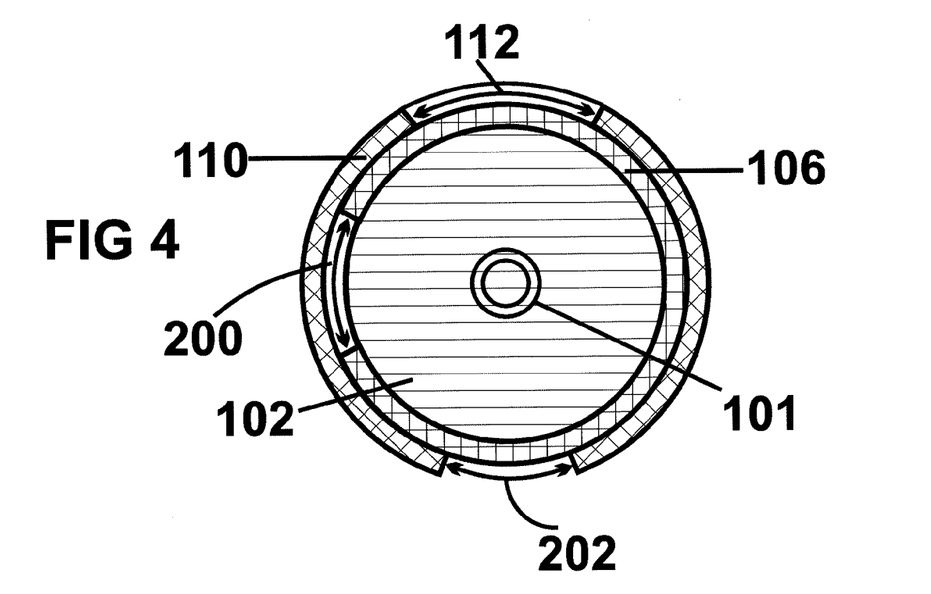
FIG. 4 is a cross-sectional view of the beverage brewing system of FIG. 3 in a second position according to an embodiment of the invention.

After the desired amount of coffee granules has been scooped onto the appropriate amount of disks 102, the user may proceed to the next step in preparing beverage brewing system 100 for brewing coffee. More particularly, if the user raised tubular housing member 110 to fill disks 102, then the user may now lower tubular housing member 110 to base 108. In the next step of preparing beverage brewing system 100 for brewing, the user is to rotate porous member 106, via base 108, relative to tubular housing member 110 so that elongated slot 200 is spaced about 90 degrees from slots 112 and about 90 degrees from elongated slot 202, as shown in FIG. 4. The proper alignment may be better understood upon reviewing FIG. 4, which illustrates a cross-sectional view of beverage brewing system 100. As shown in FIG. 4, after porous member 106 is properly rotated relative to tubular housing member 110, elongated slot 200 is spaced about 90 degrees from slots 112 and about 90 degrees from elongated slot 202. While not required, it is believed that this preferred orientation allows water to pass efficiently through beverage brewing system 100 during the brewing process. This orientation is preferred because it allows water to enter beverage brewing system 100, via porous member 106, contact the coffee granules, and exit through porous member 106 and slot 202 of beverage brewing system 100. In the process of spacing elongated slot 200 about 90 degrees from slots 112 or upon completing such alignment, it is also contemplated that the user may couple tubular housing member 110 to base 108. It should be understood that tubular housing member 110 may be coupled to base 108 via a snap fit, threaded fit, or any other commonly known method used for coupling like components.

While it has been disclosed that elongated slot 200 is preferably spaced about 90 degrees from slots 112, it should be appreciated that elongated slot 200 may be spaced any appropriate distance from elongated slots 112, without limiting the scope of the invention.

Moreover, it is contemplated that a marking or arrow 502 (FIG. 5) may be provided on base 108 and a marking or vertical line 504 (FIG. 5) may be provided on tubular housing member 110, in order to assist the user in aligning elongated slot 200 about 90 degrees from slots 112, wherein vertically aligning the two markings 502 and 504 indicates that elongated slot 200 and slots 112 are spaced about 90 degrees apart.

The following describes the method of brewing a beverage after beverage brewing system 100 has been filled with coffee granules. After the user has filled the desired amount of disks 102 with coffee granules, beverage brewing system 100 is then inserted into any vessel 500, 800 (FIG. 8), 900 (FIG. 9), and 1000 (FIG. 10) or any other appropriate vessel, containing water. The water may be hot or cold. Moreover, the water may be heated from any commonly known means used for heating water, such as but not limited to, heat from a microwave, heat from a gas or electric range, heat from an open flame, etc. It is believed that once inserted into preferably hot water, beverage brewing system 100 brews the coffee by first receiving water through slots 112. Because heated water rises to the surface, it is believe that heated water 508 naturally flows in an upward direction into slots 112 of tubular housing member 110, as shown, via water flow lines 506, in FIG. 5. It is also believed that water 508 passes into porous member 106 and into contact with the coffee granules. There, it is believed that, water 508 interacts with and flows past coffee granules, filters out through porous member 106, and finally flows out of beverage brewing system 100, via slot 202, and back into vessel 500, as shown, via water flow lines 506, in FIG. 5. It is believed that water 508 continuously circulates through beverage brewing system 100 in a similar manner until the user removes beverage brewing system 100 from vessel 500, at which point the brewing process is complete. Utilizing a thermometer as elongated member 101 allows the user to brew a beverage at a specific desired temperature in a desired amount of time. It is contemplated that the user can brew a beverage at a desired temperature by monitoring the temperature of the water, via the thermometer, as the beverage is being brewed and adjusting the heat accordingly.

It is further contemplated that beverage brewing system 100 may be used as a beverage stirrer, whereby the user continuously stirs beverage brewing system 100 in a vessel containing heated water. Stirring beverage brewing system 100 in a vessel containing heated or hot water causes the beverage to brew faster, because it is believed that the stirring action accelerates the circulation of water through beverage brewing system 100. It is also contemplated that beverage brewing system 100 may be used to as a stirrer to brew iced coffee, iced tea, and any other iced brewed beverage much the same way it would be used to brew hot brewed beverages.

Figure 6:
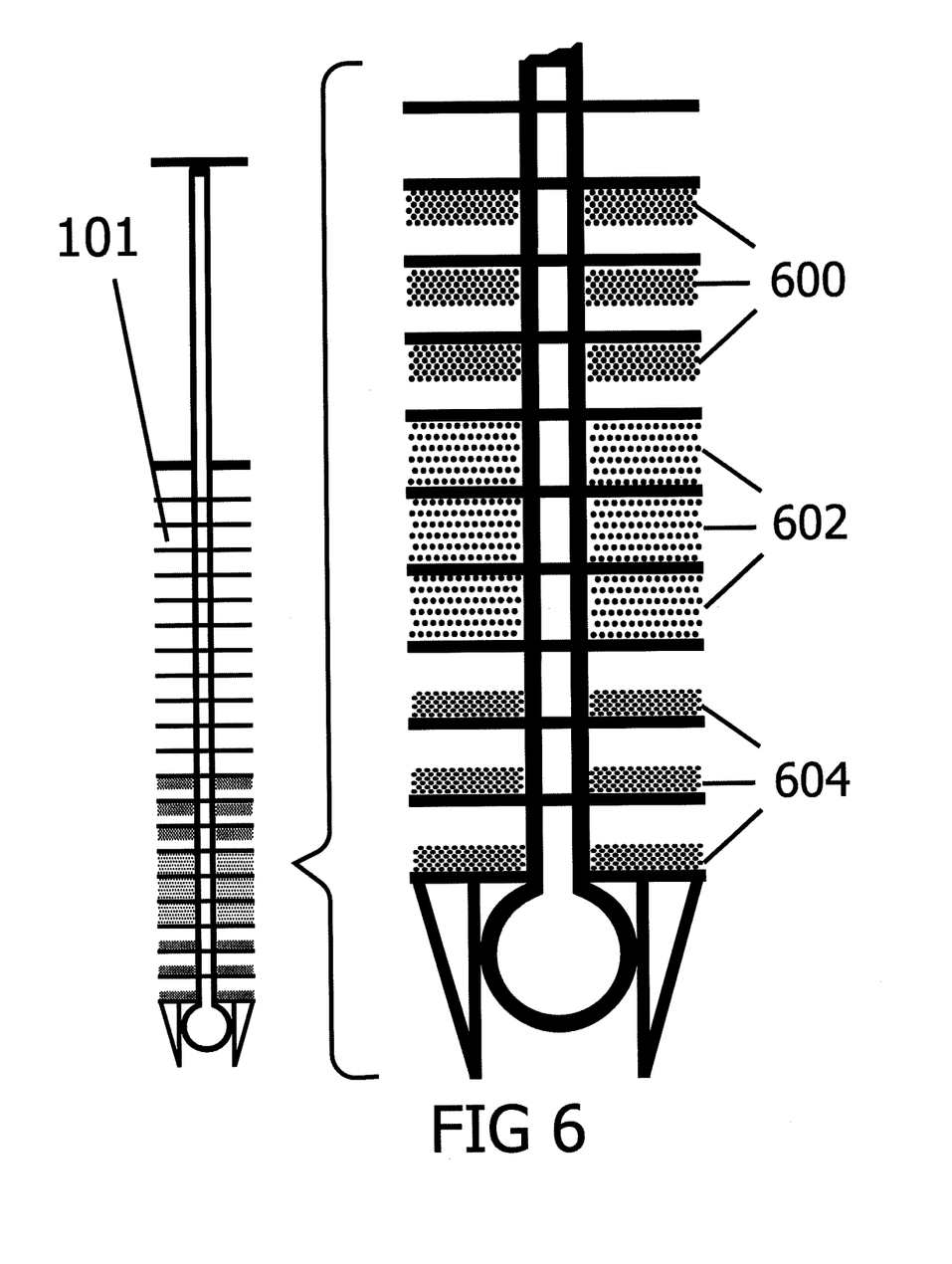
FIG. 6 is an illustration of the brewing process implemented by a beverage brewing system according to an embodiment of the invention.

Turning now to FIG. 6, elongated member 101 of beverage brewing system 100 is illustrated. More specifically, what is believed to be the interaction between water and coffee granules during the brewing process is depicted. It is believed that the brewing process has three phases. It is believed that the first phase occurs just after the user places beverage brewing system 100 into a vessel containing hot water. As a side note, it should be understood that beverage brewing system 100 may be placed into water as it is being heated as well, without limiting the scope of the invention. After the user places beverage brewing system 100 into the hot water, it is believed that the coffee granules initially float to the bottom surface of the disk located immediately above the coffee granules, as shown, via element 600, in FIG. 6. As the water continues to circulate through beverage brewing system 100, it is believed that the coffee begins to brew, as shown, via element 602, in FIG. 6. During the brewing process, it is believed that the water absorbs the flavor from the coffee granules as the coffee granules begin the process of clotting. Finally, it is believed that the coffee granules clot. Once the coffee granules clot, it is believed that they sink back to the disk that they were originally placed on, as shown, via element 604, in FIG. 6. It should also be understood that the clotted coffee granules may cling to the side of porous member 106. It is at this point that the coffee brewing process is complete.

It is believed that the distribution of granules, i.e., coffee granules, tea granules, chocolate granules, and the like, via disks 102 provides a unique flavor, strength, and reduced brewing time, compared to the prior art, as the prior art actually causes the granules to initially float to the surface of the water and clump together and then subsequently clot, thereby only using a small percentage of the granules' brewing potential. Once coffee granules float to the surface of the water and clump together, those granules are no longer accessible to the water and therefore, the water is not able to interact with those granules. Accordingly, the prior art systems brew beverages having less flavor and less strength. However, when beverage brewing system 100 is used to brew a beverage, it is believed that all of the granules remain submerged in the water because disks 102 prevent the granules from floating to the surface of the water. As such, beverage brewing system 100 brews a beverage with more flavor and strength than the prior art beverage brewing systems.

After brewing a beverage with beverage brewing system 100, beverage brewing system 100 is removed from the container, disassembled, washed, and stored leaving only a very small footprint. For example, beverage brewing system 100 may easily be stored in a drawer or a kitchen cabinet and it fits into most travel bags, suitcases, camping equipment, and the like. Due to its small size, it is contemplated that the beverage brewing system 100 may be used almost anywhere, i.e., at home, at work, on vacation, in a motor home, on a boat, etc.

Figure 7:
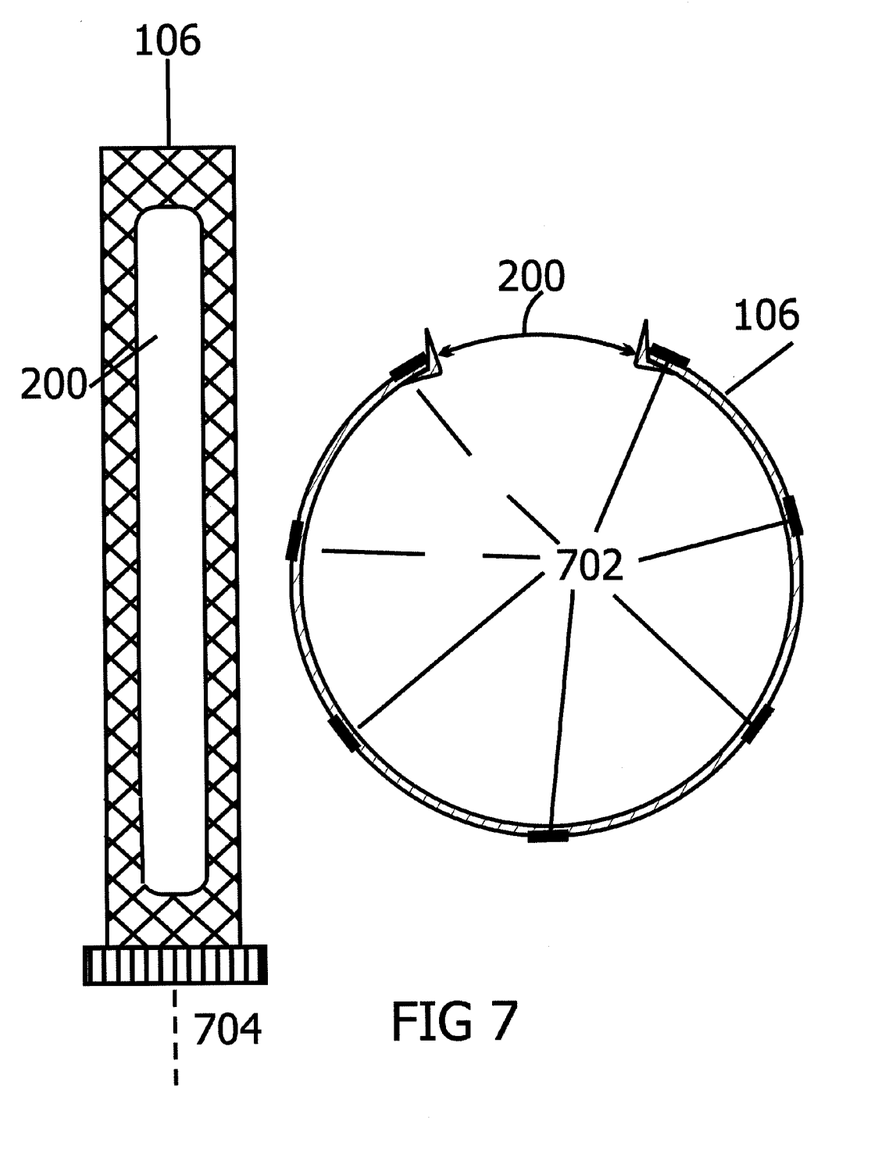
FIG. 7 is a top and a side view of an embodiment of a porous member according to an embodiment of the invention.

Turning now to FIG. 7, another embodiment of porous member 106 is illustrated comprising structural support members 702. Structural support members 702 preferably extend along a substantial portion of the external surface of porous member 106, along vertical axis 704. Structural support members 702 may preferably comprise any plastic or sturdy material capable of being heated and may be molded to porous member 106. Structural support members 702 preferably provide structural support to porous member 106 and allow porous member 106 to fit tightly around disks 102 greatly reducing and/or eliminating any open space therebetween. Essentially, structural support members 702 provide a force that causes porous member 106 to contract inwards against disks 102 so that porous member 106 does not expand and contract during the brewing process. By reducing and/or eliminating the space between porous member 106 and disks 102, the coffee granules are unable to escape from beverage brewing system 100 and into the water during the brewing process. While a plurality of structural support members 702 have been shown and described, it should be appreciated that any number of structural support members 702 may be implemented, including implementing just one structural support member, without limiting the scope of the invention. It should also be appreciated that a similar structural support member or members may be implemented around the circumference of porous member 106 to achieve the same or similar benefits as just described, without limiting the scope of the invention. It is further contemplated that a gasket or sealing member may be provided around the circumference of porous member 106 to force porous member 106 to fit tightly around disks 102, thereby greatly reducing and/or eliminating any open space therebetween.

As will be shown and described, beverage brewing system 100 may be implemented with several types of vessels or containers. While particular implementations of beverage brewing system 100 will be shown and described, it should be understood that these implementations are merely exemplary and are not intended to limit the scope of the invention. For example, it should be understood that beverage brewing system 100 may be implemented with any vessel, without limiting the scope of the invention.

Figure 8:
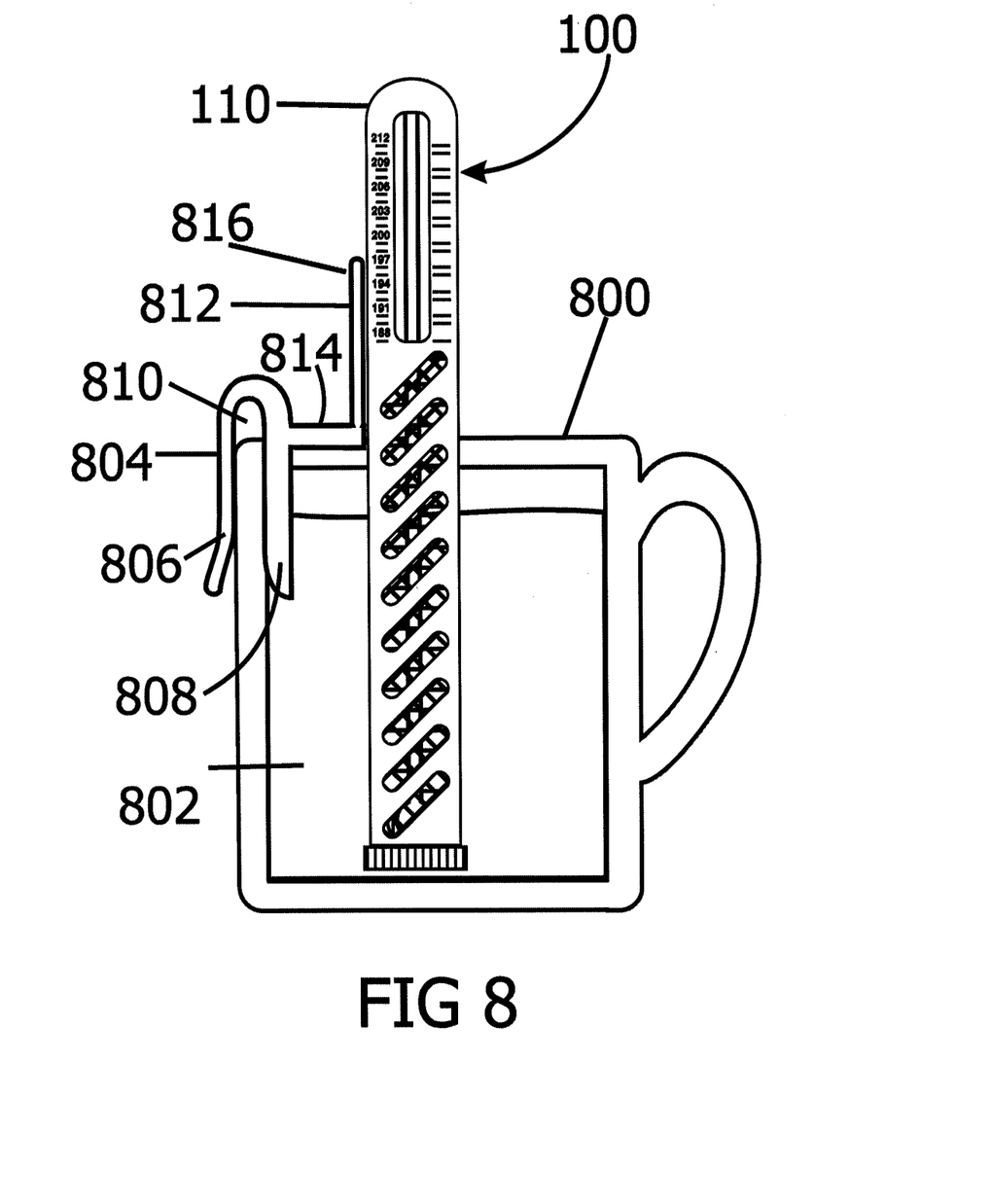
FIG. 8 is a front view of a beverage brewing system implemented with a first vessel according to an embodiment of the invention.
Figure 9:
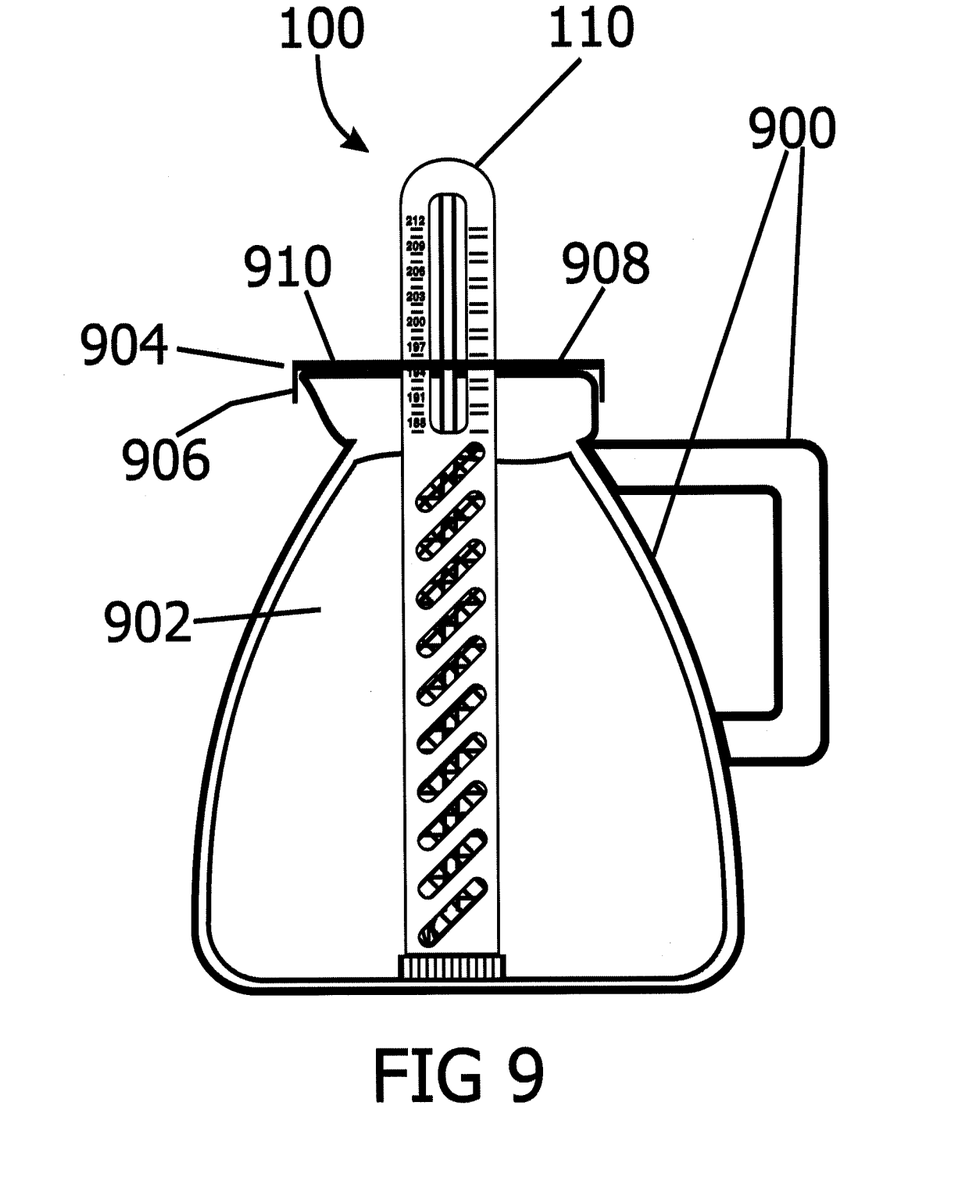
FIG. 9 is a front view of a beverage brewing system implemented with a second vessel according to an embodiment of the invention.
Figure 10:
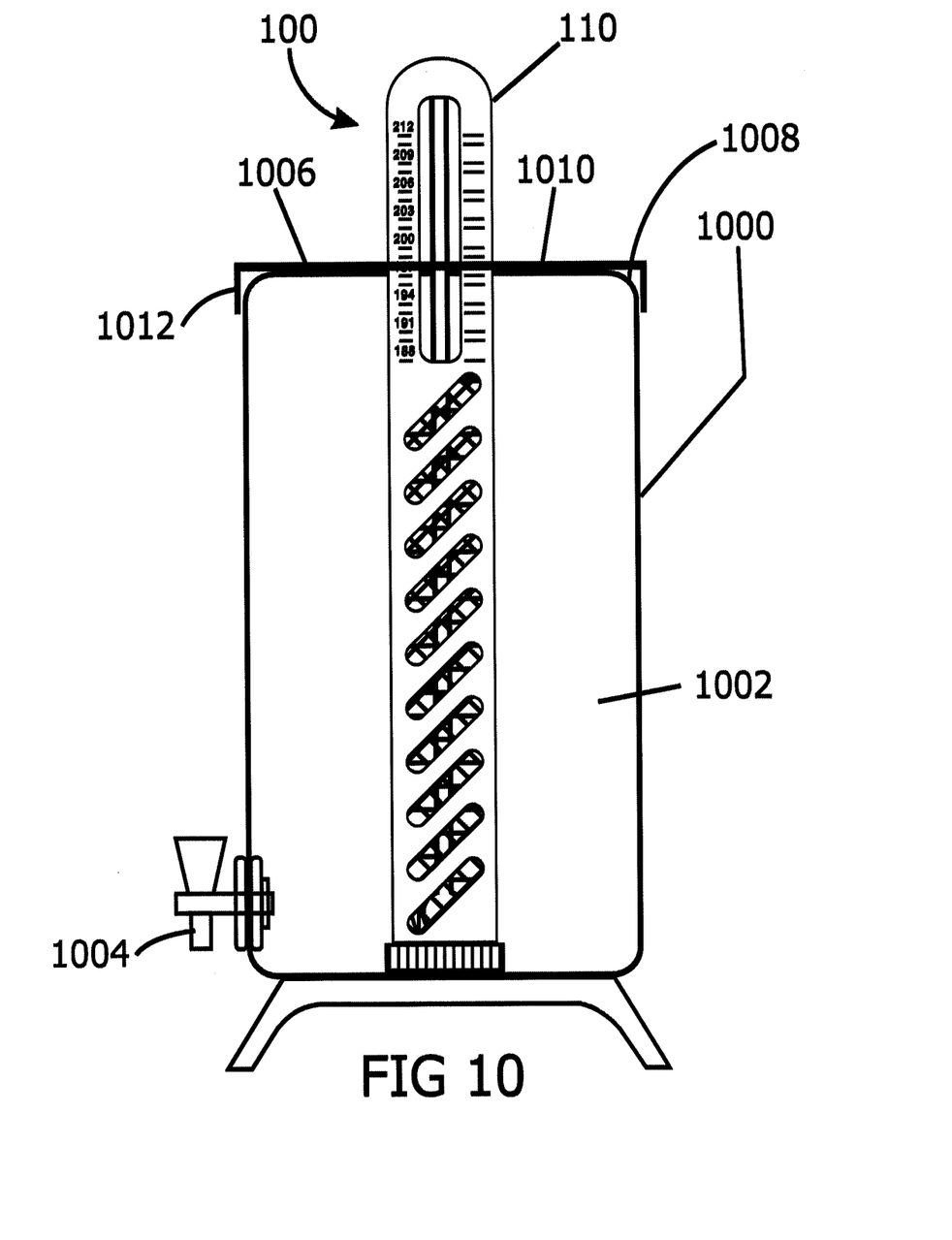
FIG. 10 is a front view of a beverage brewing system implemented with a third vessel according to an embodiment of the invention.

Referring now to FIGS. 8-10, FIG. 8 illustrates a front view of beverage brewing system 100 implemented with a first vessel or cup 800 according to an embodiment of the invention; FIG. 9 illustrates a front view of beverage brewing system 100 implemented with a second vessel or kettle 900 according to an embodiment of the invention; and FIG. 10 illustrates a front view of beverage brewing system 100 implemented with a third vessel or liquid dispenser 1000 according to an embodiment of the invention.

Turning now to FIG. 8, illustrated is beverage brewing system 100 in accordance with the teachings of an embodiment of the invention. As shown, beverage brewing system 100 is implemented with vessel 800. To brew a beverage, such as coffee, tea, hot chocolate and the like, utilizing beverage brewing system 100, beverage brewing system 100 is preferably placed inside vessel 800 and in communication with a liquid 802. Liquid 802 may be any appropriate liquid, including but not limited to any variation of water (i.e., spring water, tap water, filtered water, and the like), without limiting the scope of the invention. It should be appreciated that vessel 800 may be any appropriate container used for holding a liquid, including but not limited to a cup, a mug, and the like, without limiting the scope of the invention.

Also shown in FIG. 8 is a clip member 804. Clip member 804 is preferably used to hold beverage brewing system 100 steady after it has been placed in liquid 802 and to prevent beverage brewing system 100 from floating to the top of liquid 802. Clip member 804 preferably comprises two prongs 806 and 808 and a cavity 810 therebetween. Clip member 804 may be coupled to vessel 800 by placing the top edge of vessel 800 between prongs 806 and 808 and sliding clip member 804 down toward the bottom of vessel 800 until cavity 810 securely receives a portion of the side wall of vessel 800. Clip member 804 further comprises a mating member 812 coextruded to prongs 806 and 808. Mating member 812 preferably comprises a horizontal portion 814 and a vertical portion 816 so that when clip member 804 is coupled to vessel 800, horizontal portion 814 extends from prongs 806 and 808 in a horizontal direction towards the center of vessel 800 and vertical portion 816 is positioned in a vertical direction. It should be understood that clip member 804 is preferably constructed from any material suitable for heating, including but not limited to synthetic plastic, without limiting the scope of the present invention. Moreover, clip member 804 is preferably constructed from a molded piece of plastic. While a specific clip member 804 has been shown and described, it should be appreciated that any known clip may be implemented, without limiting the scope of the invention.

Mating member 812 preferably comprises a coupling member (not shown) on the external surface of vertical portion 816. Coupling member (not shown) may be a molded grove that extends along the length of the external surface of vertical portion 816. A complementary coupling member (not shown) is preferably provided on the external surface of tubular housing member 110. Complementary coupling member (not shown) may be a molded protrusion adapted to slidably engage and securely fit inside coupling member or groove (not shown) of vertical portion 816. While a grove and protrusion mating system have been described with respect to coupling tubular housing member 110 of beverage brewing system 100 to vertical portion 816 of mating member 812, any known mating system may be implemented to perform this function, without limiting the scope of the invention.

Referring now to FIG. 9, beverage brewing system 100 is illustrated in accordance with the teachings of an embodiment of the invention. As shown, beverage brewing system 100 is implemented with vessel 900. To brew a beverage, such as coffee, tea, hot chocolate and the like, utilizing beverage brewing system 100, beverage brewing system 100 is preferably placed inside vessel 900 and in communication with a liquid 902. Liquid 902 may be any appropriate liquid, including but not limited to any kind of water (i.e., spring water, tap water, filtered water, and the like), without limiting the scope of the invention. It should be appreciated that vessel 900 may be any appropriate container used for holding a liquid, including but not limited to a kettle, without limiting the scope of the invention.

Also shown in FIG. 9 is a cap member or cover 904. Cap member 904 is preferably used to hold beverage brewing system 100 steady after it has been placed in liquid 902 and to prevent beverage brewing system 100 from floating to the top of liquid 902. Cap member 904 is preferably circular in shape and of the size necessary to securely fit over the top of vessel 900. Cap member 904 preferably comprises a circular side wall 906 and an aperture (not shown). Cap member 904 may be coupled to vessel 900 by placing cap member 904 over the opening 908 of vessel 900 and applying a downward force to external surface 910 of cap member 904 until side wall 906 slides over and past the top edge of vessel 900 toward the bottom of vessel 900. Side wall 906 may comprise a protrusion (not shown) provided along the interior perimeter in order to snap onto a protrusion (not shown) provided along the exterior surface of the top edge of vessel 900, similar to the way a cap snaps onto a coffee can. While a specific method for coupling cap member 904 to vessel 900 has been shown and described, it should be appreciated that any known method for performing the same function may be implemented without limiting the scope of the invention.

Aperture (not shown) of cap member 904 is preferably provided to allow beverage brewing system 100 to slide through cap member 904 and into vessel 900. The diameter of aperture (not shown) of cap member 904 is adapted to be slightly larger than the diameter of tubular housing member 110 so that beverage brewing system 100 is able to fit snugly within aperture (not shown) of cap member 904. Aperture (not shown) of cap member 904 is preferably provided to stabilize beverage brewing system 100 and prevent beverage brewing system 100 from floating to the surface of liquid 902. It should be understood that cap member 904 is preferably constructed from any material suitable for heating, including but not limited to plastic, glass, metal, any suitable synthetic material, and the like, without limiting the scope of the invention. While a specific cap member 904 has been shown and described, it should be appreciated that any known cap may be implemented, without limiting the scope of the invention. To provide heat to liquid 902, vessel 900 may be placed on a stove top. However, it should be appreciated that vessel 900 may also be heated using any commonly known heating source, including but not limited to an open flame, an electric flame, an electric source, a microwave, and the like, without limiting the scope of the invention.

Referring now to FIG. 10, beverage brewing system 100 in accordance with the teachings of an embodiment of the invention is illustrated. As shown, beverage brewing system 100 is implemented with vessel 1000. To brew a beverage, such as coffee, tea, hot chocolate and the like, utilizing beverage brewing system 100, beverage brewing system 100 is preferably placed inside vessel 1000 and in communication with a liquid 1002. Liquid 1002 may be any appropriate liquid, including but not limited to any variation of water (i.e., spring water, tap water, filtered water, and the like), without limiting the scope of the invention. It should be appreciated that vessel 1000 may be any appropriate container used for holding a liquid, including but not limited to a liquid dispenser, without limiting the scope of the invention. Vessel 1000 preferably comprises a spout 1004, which is used to dispense the liquid or brewed beverage contained within vessel 1000. Spout 1004 may be any commonly known spout, without limiting the scope of the invention. Moreover, vessel 1000 may be any appropriate size, without limiting the scope of the invention.

Also shown in FIG. 10 is a cap member or cover 1006. Cap member 1006 preferably contains several substantially similar features and performs substantially similar functions as previously described for cap member 904. That is, cap member 1006 is preferably used to hold beverage brewing system 100 steady after it has been placed in liquid 1002 and to prevent beverage brewing system 100 from floating to the top of liquid 1002. Cap member 1006 is preferably circular in shape and of a size necessary to fit securely over the top of vessel 1000. Cap member 1006 may be coupled to vessel 1000 by placing cap member 1006 over the opening 1008 of vessel 1000 and applying a downward force to external surface 1010 of cap member 1006 until side wall 1012 slides over and past the top edge of vessel 1000 toward the bottom of vessel 1000. Side wall 1012 may comprise a protrusion (not shown) provided along the interior perimeter in order to snap onto a protrusion (not shown) provided along the exterior surface of the top edge of vessel 1000, similar to the way a cap snaps onto a coffee can. While a specific method for coupling cap member 1006 to vessel 1000 has been shown and described, it should be appreciated that any known method for performing the same function may be implemented without limiting the scope of the invention.

Aperture (not shown) of cap member 1006 is preferably provided to allow beverage brewing system 100 to slide through cap member 1006 and into vessel 1000. The diameter of aperture (not shown) of cap member 1006 is adapted to be slightly larger than the diameter of tubular housing member 110 so that beverage brewing system 100 is able to fit snugly within aperture (not shown) of cap member 1006. Aperture (not shown) of cap member 1006 is preferably provided to stabilize beverage brewing system 100 and prevent beverage brewing system 100 from floating to the surface of liquid 1002. It should be understood that cap member 1006 is preferably constructed from any material suitable for heating, including but not limited to plastic, glass, metal, any suitable synthetic material, and the like, without limiting the scope of the invention. While a specific cap member 1006 has been shown and described, it should be appreciated that any known cap may be implemented, without limiting the scope of the invention. To provide heat to liquid 1002, vessel 1000 may be heated by an electric heating source. However, it should be appreciated that vessel 1000 may also be heated using any commonly known heating source, including but not limited to, a stove top, an open flame, an electric flame, a microwave and the like, without limiting the scope of the invention.

It should also be appreciated that beverage brewing system 100 and each of its component parts may comprise any material suitable for heating, including but not limited to plastic, glass, metal, any suitable synthetic material, and the like, without limiting the scope of the invention. It is further contemplated that the use of metal would make beverage brewing system 100 extremely durable.

While the specification and figures disclose beverage brewing system 100 as a generally round or tubular elongated member, it should be appreciated that beverage brewing system 100 may be fabricated in any elongated shape, such as an elongated square shape, without limiting the scope of the invention.

It should be understood that one of the many advantages achieved by using the beverage brewing system of the present invention is that due to its configuration, when the beverage brewing system is removed from the vessel, it drains quicker than the prior art devices. This is achieved because the brewed beverage can escape through the unimpeded area above the granules and between the disks. That is, the brewed beverage does not have to travel through the granules to escape the device, and therefore, is not forced to drip out of the beverage brewing system, as is the case in the prior art. Allowing the brewed beverage to quickly escape the beverage brewing system provides a beverage with a higher temperature because the user is not forced to wait for the brewed beverage to slowly drain through the coffee granules, as is the case in prior art devices. This waiting period, which occurs due to the configuration of prior art devices, causes the brewed beverage to cool to a significantly lower temperature than desired.

It should also be understood that this invention is not limited to the disclosed features and other similar method and system may be utilized without departing from the spirit and the scope of the invention.

While the invention has been described with reference to the preferred embodiment and alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the invention is capable of being embodied in other forms without departing from its essential characteristics.

The invention claimed is:

1. A method of brewing a beverage using an apparatus comprising an elongated member having a plurality of brewing chambers, a filter adapted to fit over the plurality of brewing chambers, and an elongated housing member adapted to fit over the filter, the method comprising:
   separating the elongated housing member from a base of the apparatus to reveal at least one of the plurality of brewing chambers;
   filling the at least one of the plurality of brewing chambers with granules;
   coupling the elongated housing member to the base of the apparatus;
   applying heat to a liquid; and
   submerging at least a portion of the apparatus into the liquid such that said liquid contacts said granules to such extent that the liquid becomes a brewed beverage.

2. The method of claim 1, wherein the elongated housing member comprises a guide on an exterior surface of the elongated housing member indicating an amount of brewing chambers to fill with granules to make a stronger or a weaker beverage.

3. The method of claim 1, wherein granules filled in the brewing chambers will float to the top of the individual chambers when the apparatus is submerged in the liquid.

4. The method of claim 1, wherein the elongated member comprising a plurality of disks stacked along an axis of the elongated member, the filter and the plurality of disks forming the plurality of brewing chambers.

5. The method of claim 1, wherein the elongated member comprises a plurality of spaced-apart elements stacked on the elongated member with the elongated member running through the center of the spaced-apart elements, the filter and the spaced-apart elements forming the plurality of brewing chambers.

6. The method of claim 1, wherein the filter comprises a slot and wherein the elongated housing member comprises first and second slots on opposite sides of the elongated housing member.

7. The method of claim 6, wherein the plurality of brewing chambers are filled with granules through the slot of the filter.

8. The method of claim 6 wherein the liquid flows through the first and second slots of the elongated housing member when the apparatus is submerged in the liquid.

9. The method of claim 6, wherein the first slot of the elongated housing member has a width that encompasses about 30 to about 90 degrees of the diameter of the elongated housing member.

10. The method of claim 6, wherein the second slot of the elongated housing member comprises a plurality of diagonal slots along the length of the elongated housing member.

11. The method of claim 1 wherein the elongated member comprises a thermometer.

12. The method of claim 1, wherein the filter comprises a material selected from the group consisting of: filter paper, plastic, metal, synthetic material, and combinations thereof 13. The method of claim 1, wherein the filter comprises a structural support member extending along an axis of the filter.

14. The method of claim 1, wherein the beverage is selected from the group consisting of coffee, tea, and hot chocolate.

15. A method of brewing a beverage using an apparatus comprising an elongated member having a plurality of brewing chambers, a filter adapted to fit over the plurality of brewing chambers, and an elongated housing member adapted to fit over the filter, the method comprising:
rotating the filter with respect to the elongated housing member to reveal at least one of the plurality of brewing chambers;
filling the at least one of the plurality of brewing chambers with granules;
rotating the filter with respect to the elongated housing member to conceal the at least one of the plurality of brewing chambers;
applying heat to a liquid; and
submerging at least a portion of the apparatus into the liquid such that said liquid contacts said granules to such extent that the liquid becomes a brewed beverage.

16. The method of claim 15, wherein the filter is rotated with respect to the elongated housing member by rotating a base coupled to the filter.

17. The method of claim 15, wherein the filter comprises a slot and wherein the elongated housing member comprises a slot.

18. The method of claim 17, further comprising the step of aligning the slot of the filter with the slot of the elongated housing member to reveal at least one of the plurality of brewing chambers.

19. The method of claim 17, wherein the filter is rotated with respect to the elongated housing member until the slot of the filter is spaced about 90 degrees from the slot of the elongated housing member to conceal the at least one of the plurality of brewing chambers.

20. The method of claim 19, wherein the base and the elongated housing member comprise markings for assisting a user to align the slot of the filter with the slot of the elongated housing member.

* * * * *